(12) United States Patent
Yamamoto et al.

(10) Patent No.: US 11,152,884 B2
(45) Date of Patent: Oct. 19, 2021

(54) DRIVING SYSTEM

(71) Applicant: TOYOTA JIDOSHA KABUSHIKI KAISHA, Toyota (JP)

(72) Inventors: Toshihiro Yamamoto, Toyota (JP); Hiroyuki Oyanagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 16/811,203

(22) Filed: Mar. 6, 2020

(65) Prior Publication Data

US 2020/0304054 A1  Sep. 24, 2020

(30) Foreign Application Priority Data

Mar. 20, 2019  (JP) .............................. JP2019-053135

(51) Int. Cl.
*H02P 27/08* (2006.01)
*H02M 1/38* (2007.01)
*H02M 7/5387* (2007.01)

(52) U.S. Cl.
CPC .............. *H02P 27/08* (2013.01); *H02M 1/38* (2013.01); *H02M 7/53871* (2013.01)

(58) Field of Classification Search
CPC ...... H02P 6/00; H02P 6/12; H02P 6/14; H02P 6/16; H02P 7/29; H02P 8/12; H02P 8/10; H02P 9/00; H02P 9/08; H02P 11/04; H02P 11/06; H02P 21/00; H02P 21/20; H02P 21/22; H02P 23/00; H02P 23/0004; H02P 23/07; H02P 23/30; H02P 25/00; H02P 25/03; H02P 25/04; H02P 25/08; H02P 27/00; H02P 27/04; H02P 27/06; H02P 27/08; H02P 27/048; H02P 1/00; H02P 1/04; H02P 1/12; H02P 1/16; H02P 1/163; H02P 1/18; H02P 1/20; H02P 1/24; H02P 1/26; H02P 1/265; H02P 1/28; H02P 1/42; H02P 1/423; H02P 1/445; H02P 1/46; H02P 1/54; H02P 3/00; H02M 1/38; H02M 7/53871
See application file for complete search history.

(56) References Cited

U.S. PATENT DOCUMENTS

| | | | | |
|---|---|---|---|---|
| 8,193,743 B2* | 6/2012 | Yamada | .................. | H02P 27/08 |
| | | | | 318/162 |
| 9,325,274 B2* | 4/2016 | Nishihata | ................ | H02P 29/50 |
| 9,634,590 B2* | 4/2017 | Nakao | ....................... | H02P 5/74 |
| 9,903,931 B2* | 2/2018 | Omata | ................ | H02P 29/0241 |
| 10,291,174 B2* | 5/2019 | Irie | ......................... | H02M 1/12 |
| 10,461,681 B2* | 10/2019 | Irie | ........................ | H02P 27/08 |

FOREIGN PATENT DOCUMENTS

| JP | 2008-011619 A | 1/2008 |
|---|---|---|
| JP | 6221958 B2 | 10/2017 |
| JP | 2018-148722 A | 9/2018 |

\* cited by examiner

*Primary Examiner* — Antony M Paul
(74) *Attorney, Agent, or Firm* — Sughrue Mion, PLLC

(57) ABSTRACT

An object is to suppress an increase in current variation amount of a power storage device. A control device sets an allowable modulation factor, based on a circuit characteristic of a DC part that is on a power storage device side of an inverter, such that a current variation amount of the power storage device becomes equal to or smaller than an allowable current variation amount, and sets switching pattern commands of a plurality of switching elements, based on a set allowable modulation factor.

6 Claims, 13 Drawing Sheets

DRIVING SYSTEM

CROSS-REFERENCE TO RELATED APPLICATION

This application claims priority to Japanese Patent Application No. 2019-053135 filed on Mar. 20, 2019, the contents of which is incorporated herein by reference.

TECHNICAL FIELD

The present disclosure relates to a driving system.

BACKGROUND

A proposed driving system includes a motor, an inverter configured to drive the motor by switching of a plurality of switching elements; and a battery connected with the inverter via a power line. This driving system performs PWM control as control of the inverter when a modulation degree of voltage is equal to or lower than a first reference value, while performing weak field PWM control as control of the inverter when the modulation degree of voltage is higher than the first reference value (as described in, for example, JP 2018-148722A). During the weak field PWM control, this driving system calculates an estimated d-axis voltage command by using a q-axis current command, a q-axis self inductance, and a q-axis electric current under overmodulation control of the motor, and calculates an estimated q-axis voltage command by using a d-axis current command, a d-axis self inductance and a d-axis electric current under overmodulation control of the motor. The driving system subsequently calculates an estimated modulation degree by using the estimated d-axis voltage command, the estimated q-axis voltage command and an input voltage of the inverter. When the estimated modulation degree becomes equal to or higher than a second reference value that is larger than the first reference value, the driving system changes over the control of the inverter from the weak field PWM control to rectangular wave control.

CITATION LIST

Patent Literature

PTL 1: JP2018-148722A

When the driving system described above has a high modulation degree of voltage, however, switching pulses are likely to disappear due to a dead time in the course of switching of the plurality of switching elements. The disappearance of the switching pulses means that the switching elements are actually not switched but are kept off, irrespective of the presence of command values of switching pulses. Such disappearance of the switching pulses is likely to increase a variation component of a sixth electrical frequency of the motor and increase a current variation amount of the battery (power storage device).

A main object of a driving system of the present disclosure is to suppress an increase in current variation amount of a power storage device.

SUMMARY

In order to achieve the above primary object, the driving system of the disclosure is implemented by an aspect described below.

The present disclosure is directed to a driving system. The driving system includes a motor, an inverter configured to drive the motor by switching of a plurality of switching elements, a power storage device connected with the inverter via a power line, a capacitor mounted to the power line, and a control device configured to add a dead time to switching pattern commands of the plurality of switching elements and perform switching control of the plurality of switching elements. The control device sets an allowable modulation factor, based on a circuit characteristic of a DC part that is on a power storage device side of the inverter, such that a current variation amount of the power storage device becomes equal to or smaller than an allowable current variation amount, and sets the switching pattern commands of the plurality of switching elements, based on the set allowable modulation factor.

The driving system according to this aspect of the present disclosure sets the allowable modulation factor based on the circuit characteristic of the DC part that is on the power storage side of the inverter, such that the current variation amount of the power storage device becomes equal to or smaller than the allowable current variation amount; sets the switching pattern commands of the plurality of switching elements, based on the set allowable modulation factor; and adds the dead time to the switching pattern commands of the plurality of switching elements and performs switching control of the plurality of switching elements. This configuration suppresses an increase in the current variation amount of the power storage device.

DESCRIPTION OF EMBODIMENTS

The following describes some aspects of the present disclosure with reference to an embodiment.

Figure 1:
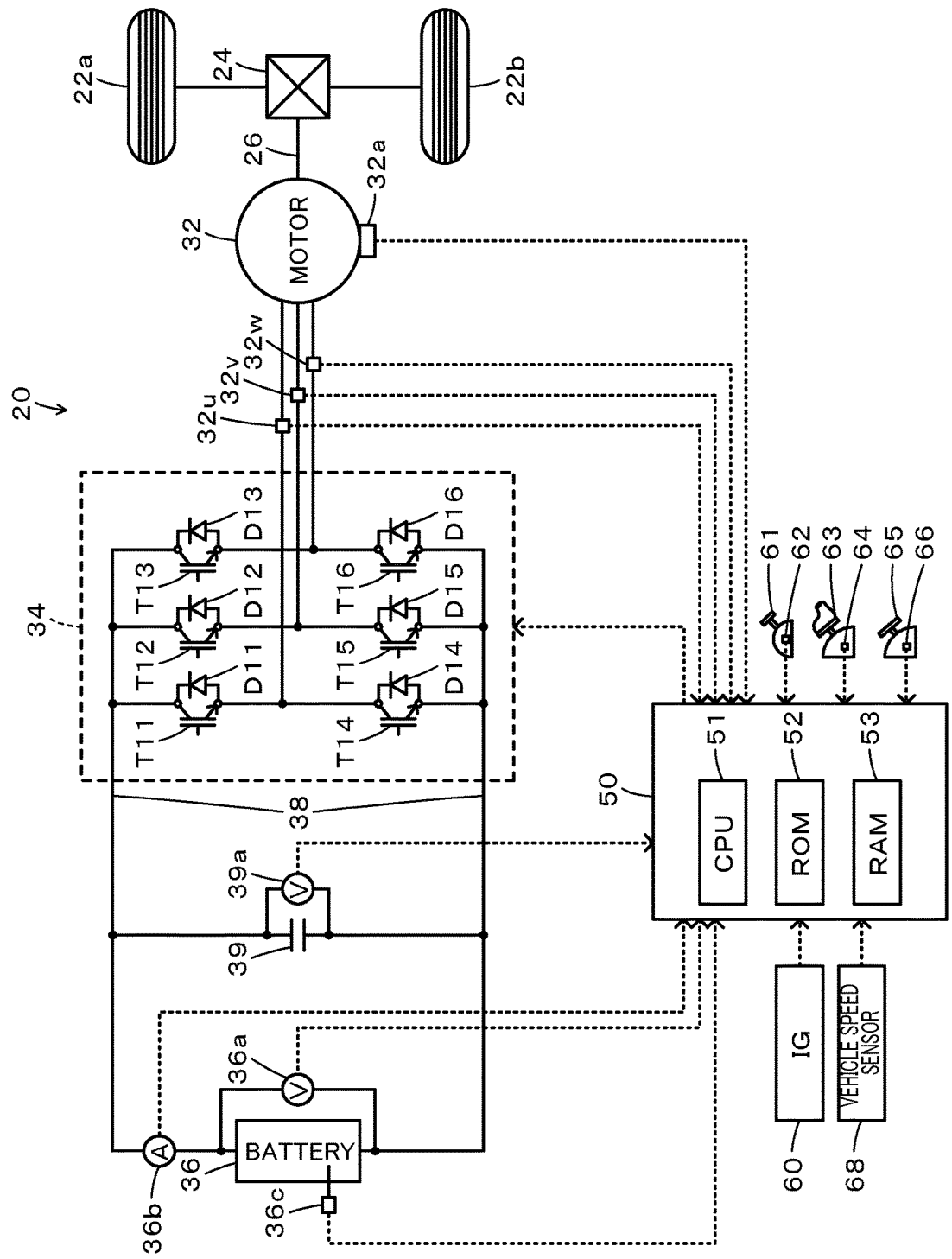
FIG. 1 is a configuration diagram illustrating the schematic configuration of an electric vehicle with a driving system mounted thereon according to one embodiment of the present disclosure.

FIG. 1 is a configuration diagram illustrating the schematic configuration of an electric vehicle 20 with a driving system mounted thereon according to one embodiment of the present disclosure. As illustrated, the electric vehicle 20 of the embodiment includes a motor 32, an inverter 34, a battery 36 serving as a power storage device, a capacitor 39 and an electronic control unit 50. The "driving system" mainly corresponds to the motor 32, the inverter 34, the battery 36, the capacitor 39 and the electronic control unit 50 according to the embodiment.

The motor 32 is configured as a synchronous generator motor having a rotor with permanent magnets embedded therein and a stator with three-phase coils wound thereon. The rotor of this motor 32 is connected with a driveshaft 26 that is coupled with drive wheels 22a and 22b via a differential gear 24.

The inverter 34 is used to drive the motor 32. This inverter 34 is connected with the battery 36 via power lines 38 and includes six transistors T11 to T16 serving as switching elements and six diodes D11 to D16. The transistors T11 to T16 are arranged in pairs, such that two transistors in each pair respectively serve as a source and a sink relative to a positive bus bar and a negative bus bar of the power lines 38. The respective phases of the three-phase coils (U phase, V phase and W phase coils) of the motor 32 are connected with connection points of the respective pairs of the transistors T11 to T16. The diodes D11 to d16 are respectively connected in parallel to the transistors T11 to T16. When a voltage is applied to the inverter 34, the electronic control unit 50 serves to regulate the rate of ON times of the respective pairs of the transistors T11 to T16 included in the inverter 34, such as to form a rotating magnetic field in the three-phase coils of the motor 32 and thereby rotate and drive the rotor of the motor 32.

The battery 36 is configured as, for example, a lithium ion rechargeable battery or a nickel metal hydride battery and is connected with the inverter 34 via the power lines 38 as described above. The capacitor 39 is mounted to the positive bus bar and the negative bus bar of the power lines 38.

The electronic control unit 50 is configured as a CPU 51-based microprocessor and includes a ROM 52 configured to store processing programs, a RAM 53 configured to temporarily store data, and input/output ports (not shown) in addition to the CPU 51. Signals from various sensors are input into the electronic control unit 50 via the input port. The signals input into the electronic control unit 50 include, for example, a rotational position θm of the rotor of the motor 32 from a rotational position detection sensor (for example, resolver) 32a configured to detect the rotational position of the rotor of the motor 32 and electric currents Iu, Iv and Iw of the respective phases of the motor 32 from current sensors 32u, 32v and 32w configured to detect the electric currents flowing in the respective phases of the motor 32. The input signals also include a voltage Vb of the battery 36 from a voltage sensor 36a placed between terminals of the battery 36, an electric current Ib of the battery 36 from a current sensor 36b mounted to an output terminal of the battery 36, a temperature Tb of the battery 36 from a temperature sensor 36c mounted to the battery 36, and a voltage Vc of the capacitor 39 (power lines 38) from a voltage sensor 39a placed between terminals of the capacitor 39. The input signals further include an ignition signal from an ignition switch 60, a shift position SP from a shift position sensor 62 configured to detect an operating position of a shift lever 61, an accelerator position Acc from an accelerator pedal position sensor 64 configured to detect a depression amount of an accelerator pedal 63, a brake pedal position BP from a brake pedal position sensor 66 configured to detect a depression amount of a brake pedal 65, and a vehicle speed V from a vehicle speed sensor 68.

The electronic control unit 50 outputs, for example, switching control signals to the transistors T11 to T16 included in the inverter 34 via the output port. The electronic control unit 50 calculates an electrical angle θe, an electrical angular velocity ωe and a rotation speed Nm of the motor 32, based on the rotational position θm of the rotor of the motor 32 from the rotational position detection sensor 32a. The electronic control unit 50 also calculates a state of charge SOC of the battery 36, based on an integrated value of the electric current Ib of the battery 36 from the current sensor 36b. The state of charge SOC herein denotes a ratio of the capacity of electric power dischargeable from the battery 36 to the overall capacity of the battery 36.

In the electric vehicle 20 of the embodiment having the above configuration, the electronic control unit 50 performs drive control described below. In the drive control, the electronic control unit 50 sets a required torque Td* that is required for the driveshaft 26, based on the accelerator position Acc and the vehicle speed V, sets a torque command Tm* of the motor 32, such that the set required torque Td* is output to the driveshaft 26, and performs switching control of the transistors T11 to T16 included in the inverter 34, such that the motor 32 is driven with the set torque command Tm*.

The control of the inverter 34 is described. According to the embodiment, the electronic control unit 50 switches over the control of the inverter 34 between pulse width modulation (PWM) control and rectangular wave control. The PWM control gives a modulation factor Vr in a range of a value 0 to a value of lower than 0.78, whereas the rectangular wave control gives the modulation factor Vr of a value 0.78.

Figure 2:
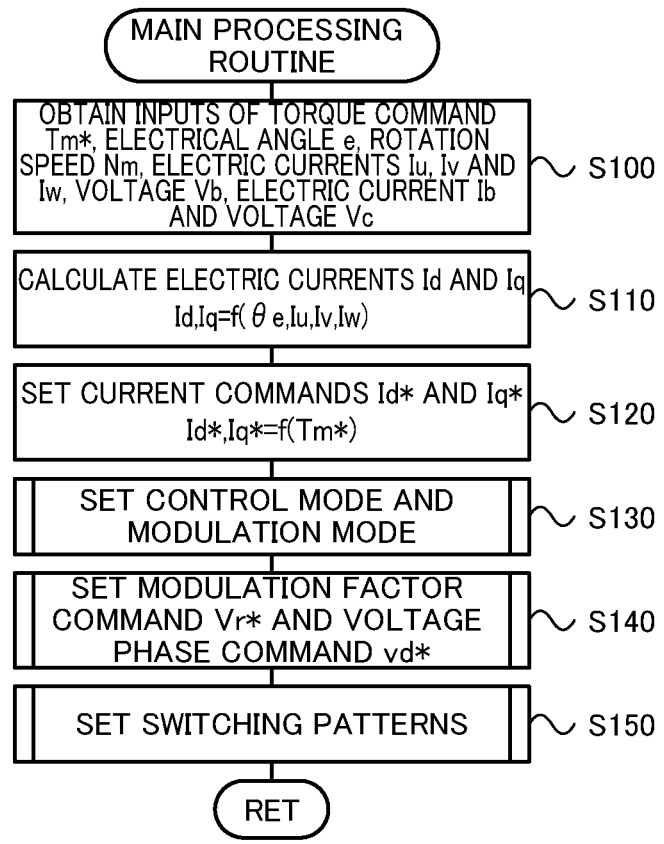
FIG. 2 is a flowchart showing one example of a main processing routine performed by an electronic control unit.

The following describes operations of the electric vehicle 20 of the embodiment having the configuration described above or more specifically a series of operations when the inverter 34 is controlled by the PWM control. FIG. 2 is a flowchart showing one example of a main processing routine performed by the electronic control unit 50. This routine is performed repeatedly during the control of the inverter 34 by the PWM control.

When the main processing routine of FIG. 2 is triggered, the electronic control unit 50 first obtains the input data, for example, the torque command Tm*, the electrical angle θe and the rotation speed Nm of the motor 32, the electric currents Iu, Iv and Iw of the respective phases of the motor 32, the voltage Vb and the electric current Ib of the battery 36, and the voltage Vc of the capacitor 39 (step S100). The torque command Tm* set in the drive control described above may be input as the torque command Tm* of the motor 32. The electrical angle θe and the rotation speed Nm calculated from the rotational position θm of the motor 32 detected by the rotational position detection sensor 32a may be input as the electrical angle θe and the rotation speed Nm of the motor 32. The electric currents Iu, Uv and Iw detected by the current sensors 32u, 32v and 32w may be input as the electric currents Iu, Iv and Iw of the respective phases of the motor 32. The voltage Vb detected by the voltage sensor 36a may be input as the voltage Vb of the battery 36. The electric current Ib detected by the current sensor 36b may be input as the electric current Ib of the battery 36. The voltage Vc detected by the voltage sensor 39a may be input as the voltage Vc of the capacitor 39.

After obtaining the input data, the electronic control unit 50 performs a coordinate transformation (three phase to two phase conversion) of the electric currents Iu, Iv and Iw of the respective phases of the motor 32 to electric currents Id and Iq of a d axis and a q axis by using the electrical angle θe of the motor 32 (step S110). The electronic control unit 50 subsequently sets current commands Id* and Iq* of the d axis and the q axis, based on the torque command Tm* of the motor 32 (step S120). According to the embodiment, a procedure of setting the current commands Id* and Iq* of the d axis and the q axis specifies and stores in advance a relationship between the torque command Tm* of the motor 32 and the current commands Id* and Iq* of the d axis and the q axis in the form of a map in the ROM 52. When a value of the torque command Tm* of the motor 32 is given, the procedure reads out values of the current commands Id* and Iq* of the d axis and the q axis corresponding to the given value of the torque command Tm* from the map to set the read-out values as the current commands Id* and Iq*.

The electronic control unit 50 subsequently performs a mode setting process shown in FIG. 3 to set a control mode of the inverter 34 and a modulation mode that is employed to set voltage commands Vu*, Vv* and Vw* of the respective phases (step S130), and also performs a command value setting process shown in FIG. 4 to set a modulation factor command Vr* and a voltage phase command φvd* on the d-axis basis (step S140). The electronic control unit 50 subsequently performs a switching pattern command setting process shown in FIG. 5 to set switching pattern commands of the transistors T11 to T16 (step S150) and then terminates this main process routine. After setting the switching pattern commands of the transistors T11 to T16, the electronic control unit 50 adds a dead time DT to the set switching pattern commands of the transistors T11 to T16 and performs switching control of the transistors T11 to T16.

According to the embodiment, a current feedback control mode and a torque feedback control mode are employed as the control mode of the inverter 34. A third harmonic wave mode and a two-phase modulation mode are employed as the modulation mode. These modes are known, and their details will be described later. For the better understanding, the following describes the switching pattern command setting process of FIG. 5, the mode setting process of FIG. 3 and the command value setting process of FIG. 4 in this sequence.

Figure 4:
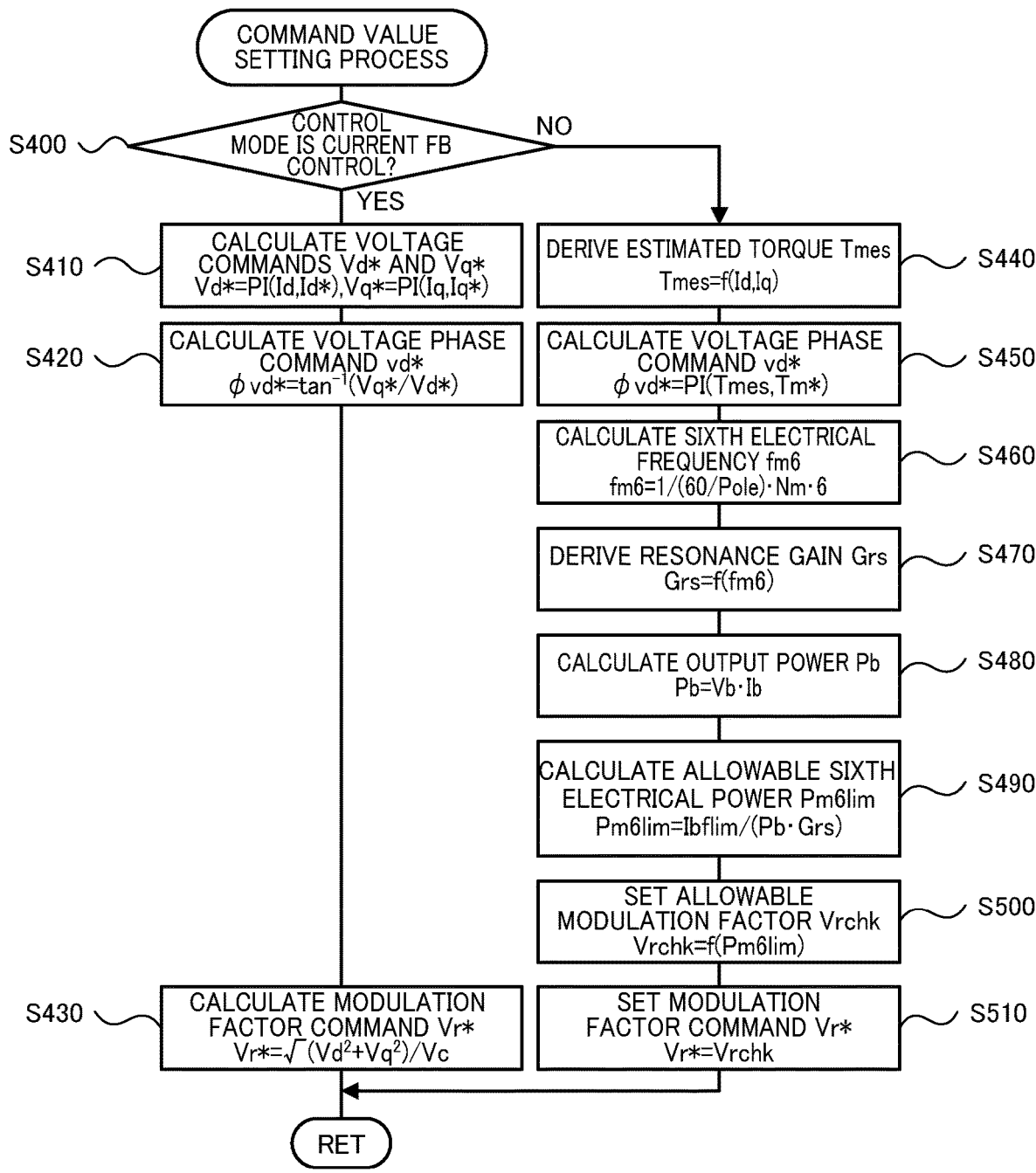
FIG. 4 is a flowchart showing one example of a command value setting process.
Figure 5:
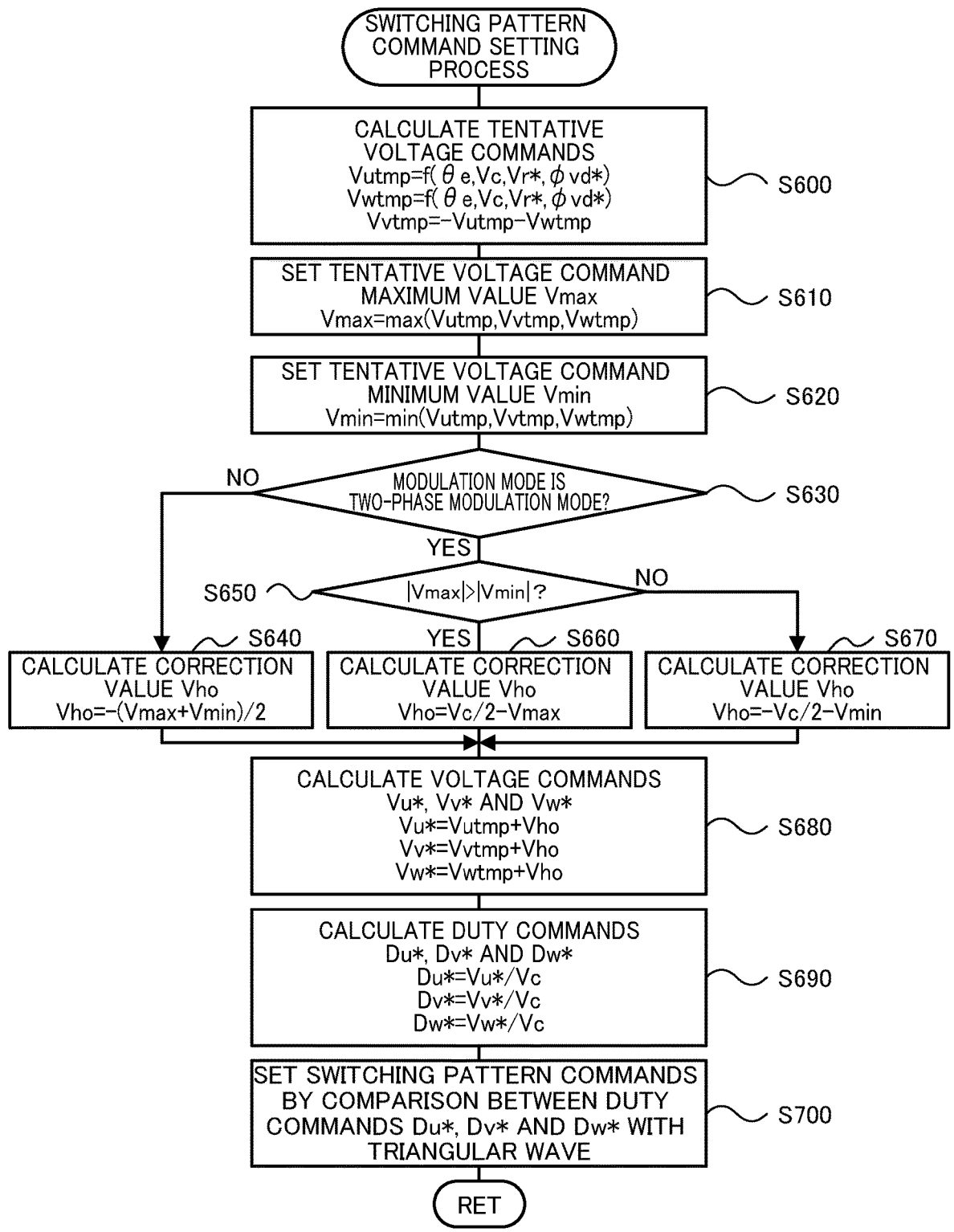
FIG. 5 is a flowchart showing one example of a switching pattern command setting process.

The switching pattern command setting process of FIG. 5 is described first. In this switching pattern command setting process, the electronic control unit 50 first calculates tentative voltage commands Vutmp, Vvtmp and Vwtmp as tentative values of the voltage commands Vu*, Vv* and Vw* of the respective phases according to Equations (1) to (3) given below by using the electrical angle θe of the motor 32, the voltage Vc of the capacitor 39, the modulation factor command Vr* and the voltage phase command φvd* (step S600). The electrical angle θe and the voltage Vc input at step S100 described above may be used as the electrical angle θe of the motor 32 and the voltage Vc of the capacitor 39. The modulation factor command Vr* and the voltage phase command φvd* set in the command value setting process of FIG. 4 may be used as the modulation factor command Vr* and the voltage phase command φvd*.

Math. 1

$$Vutmp = \sqrt{\frac{2}{3}} \times Vc \times Vr* \times \cos(\theta e + \phi vd*) \quad (1)$$

$$Vwtmp = \sqrt{\frac{2}{3}} \times Vc \times Vr* \times \cos(\theta e + \phi vd*120°) \quad (2)$$

$$Vvtmp = -Vutmp - Vwtmp \quad (3)$$

The electronic control unit 50 subsequently sets a tentative voltage command maximum value Vmax among the tentative voltage commands Vutmp, Vvtmp and Vwtmp of the respective phases according to Equation (4) given below (step S610) and sets a tentative voltage command minimum value Vmin among the tentative voltage commands Vutmp, Vvtmp and Vwtmp of the respective phases according to Equation (5) given below (step S620).

$$V\max = \max(Vu\text{tmp}, Vv\text{tmp}, Vw\text{tmp}) \quad (4)$$

$$V\min = \min(Vu\text{tmp}, Vv\text{tmp}, Vw\text{tmp}) \quad (5)$$

The electronic control unit 50 then checks the modulation mode (step S630). When the modulation mode is the third harmonic wave mode, the electronic control unit 50 calculates a correction value Vho by dividing the sum of the tentative voltage command maximum value Vmax and the tentative voltage command minimum value Vmin by 2 and then multiplying the quotient by a value of −1 according to Equation (6) given below (step S640).

$$Vho = -(V\max + V\min)/2 \quad (6)$$

After calculating the correction value Vho, the electronic control unit 50 calculates voltage commands Vu*, Vv* and Vw* of the respective phases by adding the correction value Vho to the tentative voltage commands Vutmp, Vvtmp and Vwtmp of the respective phases according to Equations (7) to (9) given below (step S680). The electronic control unit 50 subsequently calculates duty commands Du*, Dv* and Dw* of the respective phases by dividing the voltage commands Vu*, Vv* and Vw* of the respective phases by the voltage Vc of the capacitor 39 according to Equations (10) to (12) given below (step S690).

$$Vu* = Vu\text{tmp} + Vho \quad (7)$$

$$Vv* = Vv\text{tmp} + Vho \quad (8)$$

$$Vw* = Vw\text{tmp} + Vho \quad (9)$$

$$Du^* = Vu^*/Vc \quad (10)$$

$$Dv^* = Vv^*/Vc \quad (11)$$

$$Dw^* = Vw^*/Vc \quad (12)$$

The electronic control unit 50 compares the duty commands Du*, Dv* and Dw* of the respective phases with a triangular wave to set switching pattern commands of the transistors T11 to T16 (step S700) and then terminates the switching pattern command setting process of FIG. 5. As described above, the electronic control unit 50 performs switching control of the transistors T11 to T16 by adding the dead time DT to the set switching pattern commands of the transistors T11 to T16.

Figure 6:
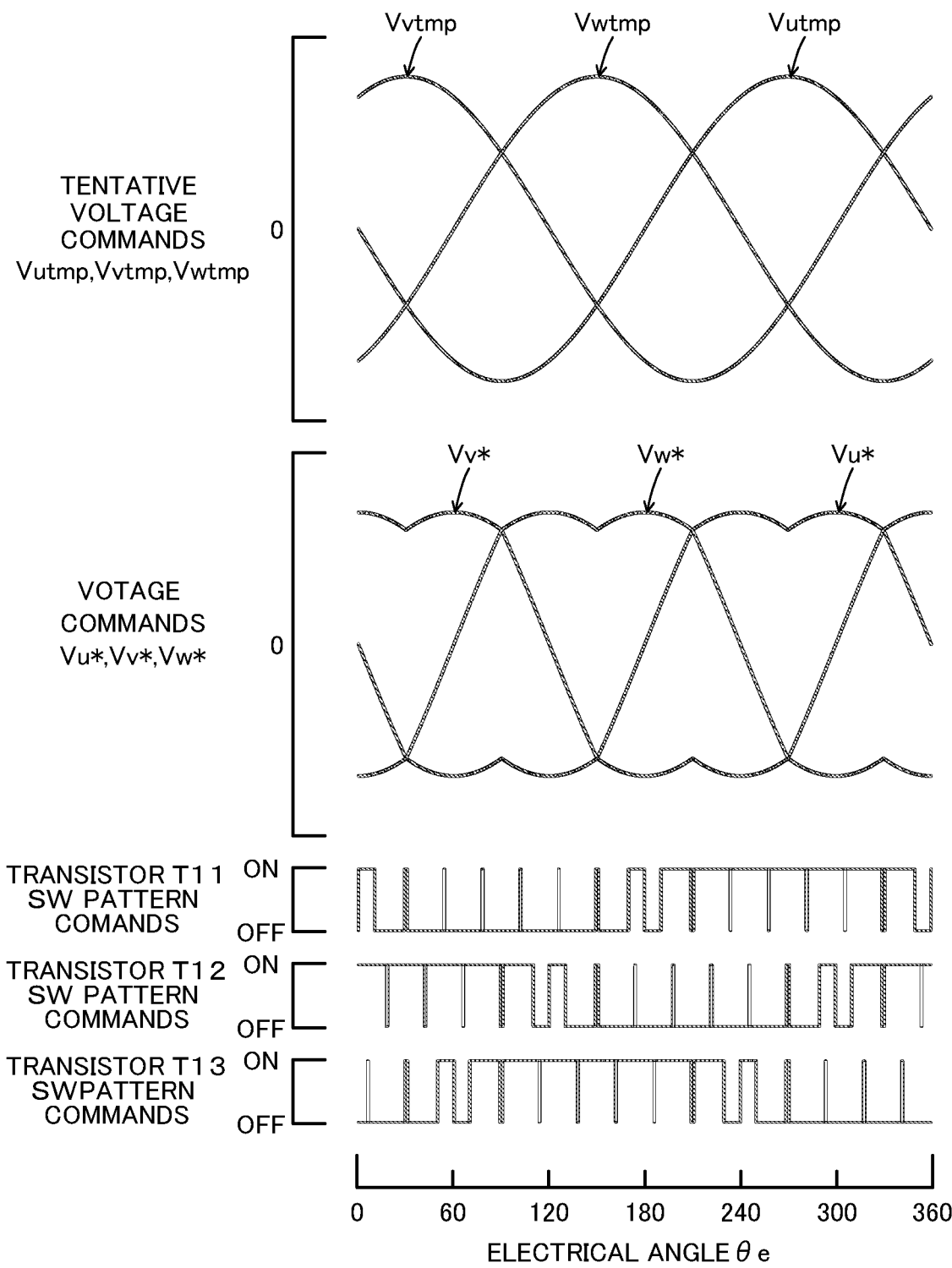
FIG. 6 is a diagram illustrating one example of tentative voltage commands Vutmp, Vvtmp and Vwtmp of respective phases, voltage commands Vu*, Vv* and Vw* of the respective phases and switching pattern commands of transistors T11 to T13 when a modulation mode is a third harmonic wave mode.

FIG. 6 is a diagram illustrating one example of the tentative voltage commands Vutmp, Vvtmp and Vwtmp of the respective phases, the voltage commands Vu*, Vv* and Vw* of the respective phases and the switching pattern commands of the transistors T11 to T13 when the modulation mode is the third harmonic wave mode. The switching pattern commands of the transistors T13 to T16 are respectively on-off inversions of the switching pattern commands of the transistors T11 to T13.

When the modulation mode is the two-phase modulation mode at step S630, on the other hand, the electronic control unit 50 compares the absolute value of the tentative voltage command maximum value Vmax and the absolute value of the tentative voltage command minimum value Vmin (step S650). When the absolute value of the tentative voltage command maximum value Vmax is larger than the absolute value of the tentative voltage command minimum value Vmin, the electronic control unit 50 calculates the correction value Vho by dividing the voltage Vc of the capacitor 39 by a value of 2 and then subtracting the tentative voltage command maximum value Vmax from the quotient according to Equation (13) given below (step S660), performs the processing of steps S680 to S700 described above and then terminates the switching pattern command setting process of FIG. 5.

$$Vho = Vc/2 - V\text{max} \quad (13)$$

Figure 3:
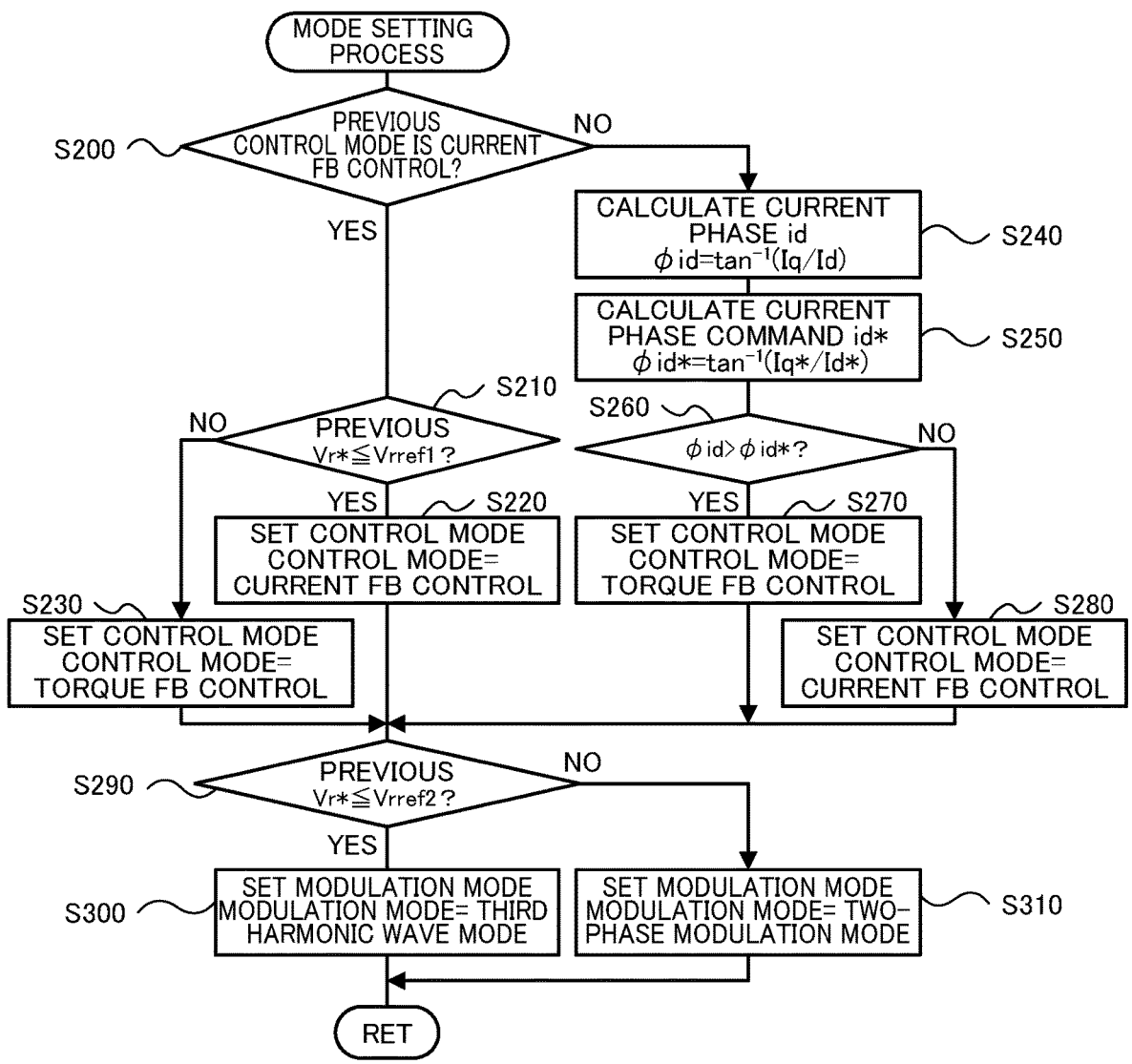
FIG. 3 is a flowchart showing one example of a mode setting process.

When the absolute value of the tentative voltage command maximum value Vmax is equal to or smaller than the absolute value of the tentative voltage command minimum value Vmin at step S650, on the other hand, the electronic control unit 50 calculates the correction value Vho by dividing the voltage Vc of the capacitor 39 by a value of 2, multiplying the quotient by a value of −1, and then subtracting the tentative voltage command minimum value Vmin from the product according to Equation (14) given below (step S670), performs the processing of steps S680 to S700 described above and then terminates the switching pattern command setting process of FIG. 3.

$$Vho = -Vc/2 - V\text{min} \quad (14)$$

Figure 7:
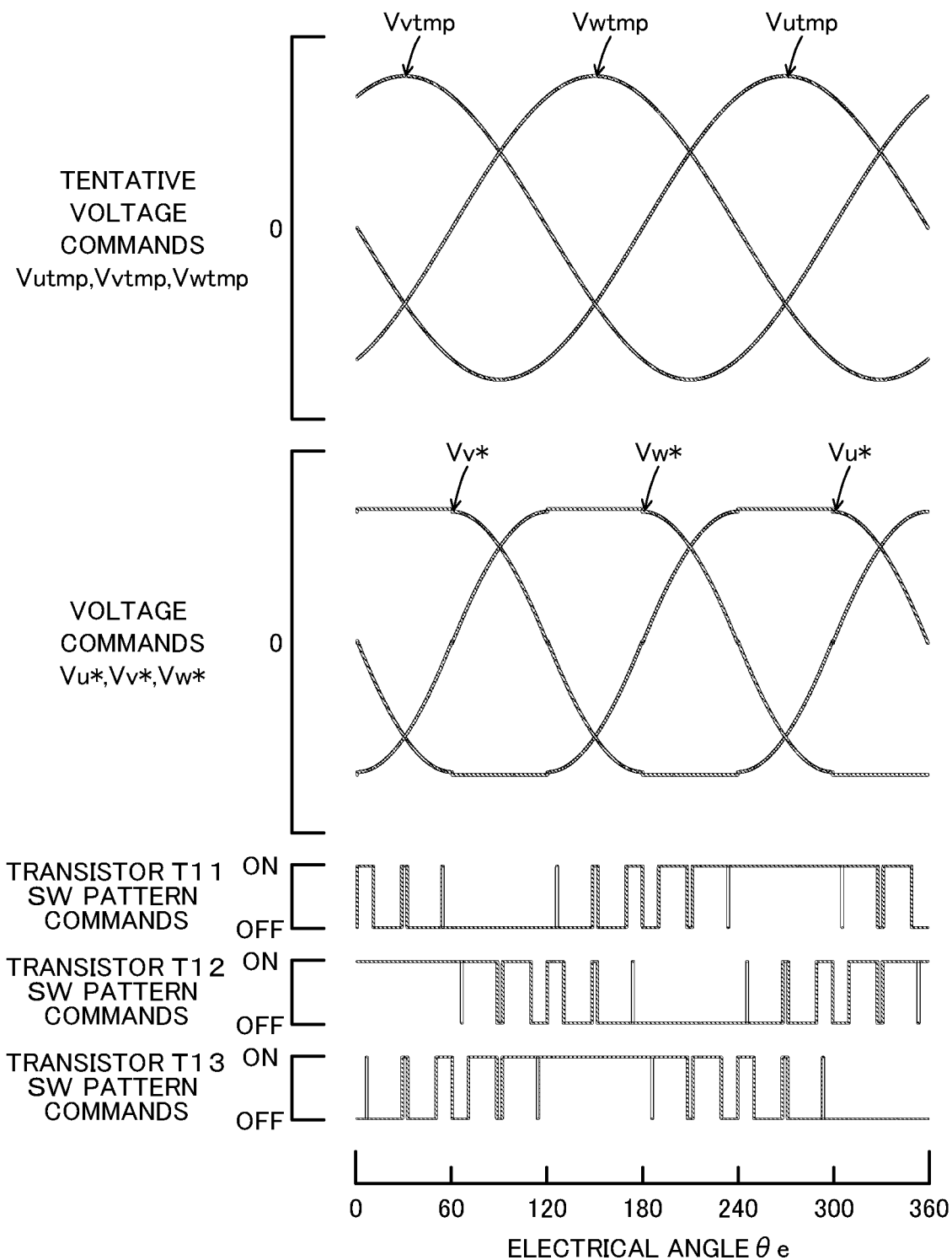
FIG. 7 is a diagram illustrating one example of the tentative voltage commands Vutmp, Vvtmp and Vwtmp of the respective phases, the voltage commands Vu*, Vv* and Vw* of the respective phases and the switching pattern commands of the transistors T11 to T13 when the modulation mode is a two-phase modulation mode.

FIG. 7 is a diagram illustrating one example of the tentative voltage commands Vutmp, Vvtmp and Vwtmp of the respective phases, the voltage commands Vu*, Vv* and Vw* of the respective phases and the switching pattern commands of the transistors T11 to T13 when the modulation mode is the two-phase modulation mode. The switching pattern commands of the transistors T13 to T16 are respectively on-off inversions of the switching pattern commands of the transistors T11 to T13.

The following describes the mode setting process of FIG. 3. In this mode setting process, the electronic control unit 50 first checks whether a previous control mode of the inverter 34 is the current feedback control mode or the torque feedback control mode (step S200).

When the previous control mode of the inverter 34 is the current feedback control mode, the electronic control unit 50 compares a previous modulation factor command (previous Vr*) with a reference value Vrref1 (step S210). The reference value Vrref1 will be described later more in detail. When the previous modulation factor command (previous Vr*) is equal to or smaller than the reference value Vrref1, the electronic control unit 50 sets the current feedback control mode as the control mode of the inverter 34 (step S220). When the previous modulation factor command (previous Vr*) is larger than the reference value Vrref1, on the other hand, the electronic control unit 50 sets the torque feedback control mode as the control mode of the inverter 34 (step S230).

When the previous control mode of the inverter 34 is the torque feedback control mode at step S200, on the other hand, the electronic control unit 50 calculates a current phase ϕid on the d-axis basis according to Equation (15) given below by using the electric currents Id and Iq of the d axis and the q axis (step S240) and calculates a current command phase ϕid* on the d-axis basis according to Equation (16) given below by using the current commands Id* and Iq* of the d axis and the q axis (step S250).

Math. 2

$$\phi id = \tan^{-1} \frac{Iq}{Id} \quad (15)$$

$$\phi id* = \tan^{-1} \frac{Iq*}{Id*} \quad (16)$$

The electronic control unit 50 subsequently compares the current phase ϕid with the current command phase ϕid* (step S260). When the current phase ϕid is larger than the current command phase ϕid*, the electronic control unit 50 sets the torque feedback control mode as the control mode of the inverter 34 (step S270). When the current phase ϕid is equal to or smaller than the current command phase ϕid*, on the other hand, the electronic control unit 50 sets the current feedback control mode as the control mode of the inverter 34 (step S280).

After setting the control mode of the inverter 34 at any of the processing of steps S220, S230, S270 and S280, the electronic control unit 50 compares the previous modulation factor command (previous Vr*) with a reference value Vrref2 that is smaller than the reference value Vrref1 (step S290). The reference value Vrref2 will be described later more in detail. When the previous modulation factor command (previous Vr*) is equal to or smaller than the reference value Vrref2, the electronic control unit 50 sets the third harmonic wave mode as the modulation mode (step S300) and then terminates the mode setting process of FIG. 3. When the previous modulation factor command (previous Vr*) is larger than the reference value Vrref2, on the other hand, the electronic control unit 50 sets the two-phase modulation mode as the modulation mode (step S310) and then terminates the mode setting process of FIG. 3.

Figure 8:
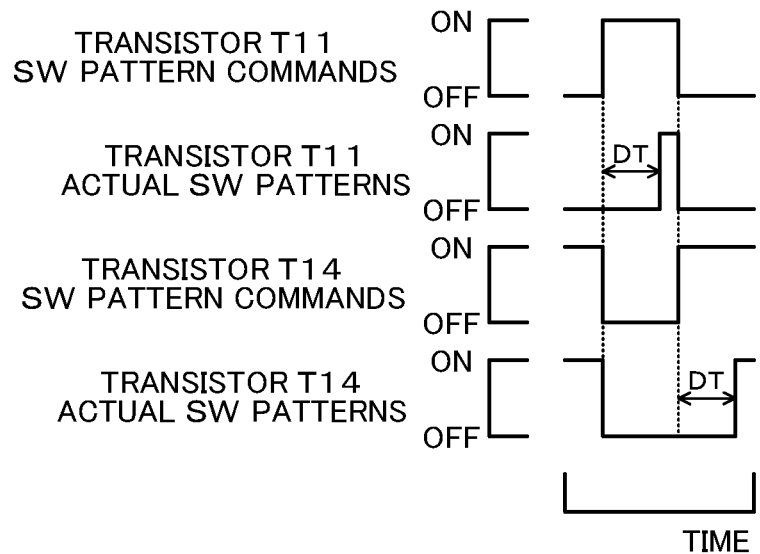
FIG. 8 is a diagram illustrating one example of switching pattern commands and actual switching patterns of transistors T11 and T14.
Figure 9:
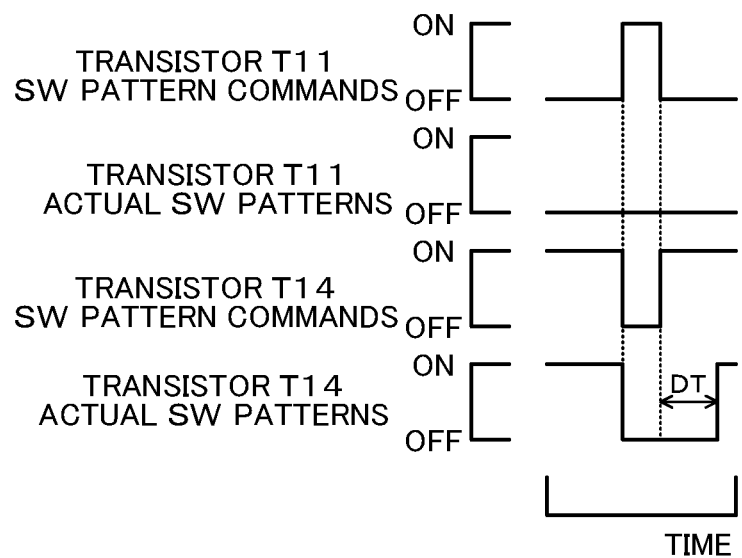
FIG. 9 is a diagram illustrating another example of the switching pattern commands and the actual switching patterns of the transistors T11 and T14.

The following describes the reference value Vrref1 and the reference value Vrref2 more in detail. FIG. 8 and FIG. 9 are diagrams respectively illustrating examples of switching pattern commands and actual switching patterns of the transistors T11 and T14. FIG. 8 illustrates the example when ON times of the switching pattern commands of the transistors T11 and T14 are both longer than a dead time DT. FIG. 9 illustrates the example when the ON time of the switching pattern command of the transistor T11 is shorter than the dead time DT. In the illustrated example of FIG. 8, switching pulses respectively appear in the actual switching patterns of the transistors T11 and T14 (i.e., both the transistors T11 and T14 are switched ON). In the illustrated example of FIG. 9, on the other hand, a switching pulse disappears in the actual switching pattern of the transistor T11 (i.e., the transistor T11 is not switched ON but is kept OFF).

Figure 10:
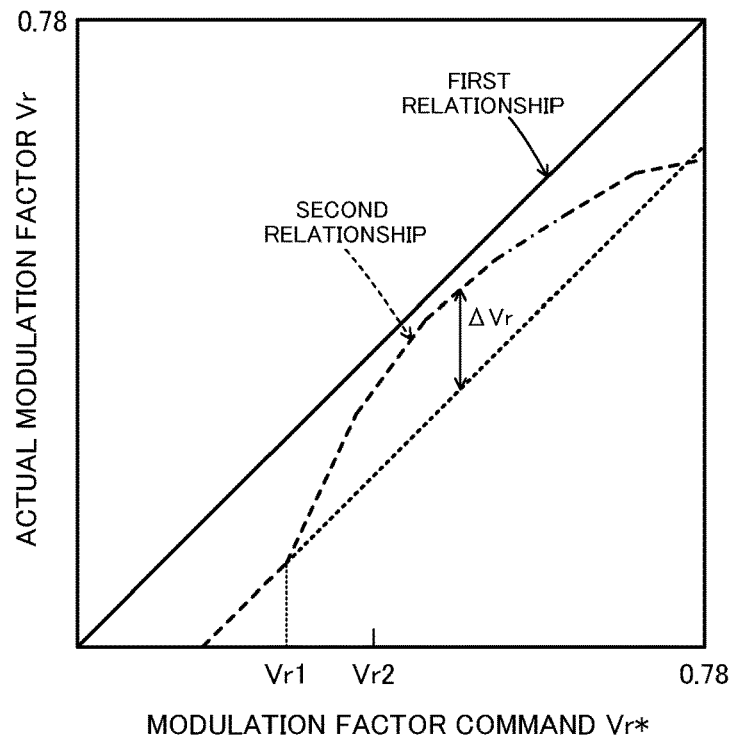
FIG. 10 is a diagram illustrating one example of a relationship between a modulation factor command Vr* and an actual modulation factor Vr.
Figure 11:
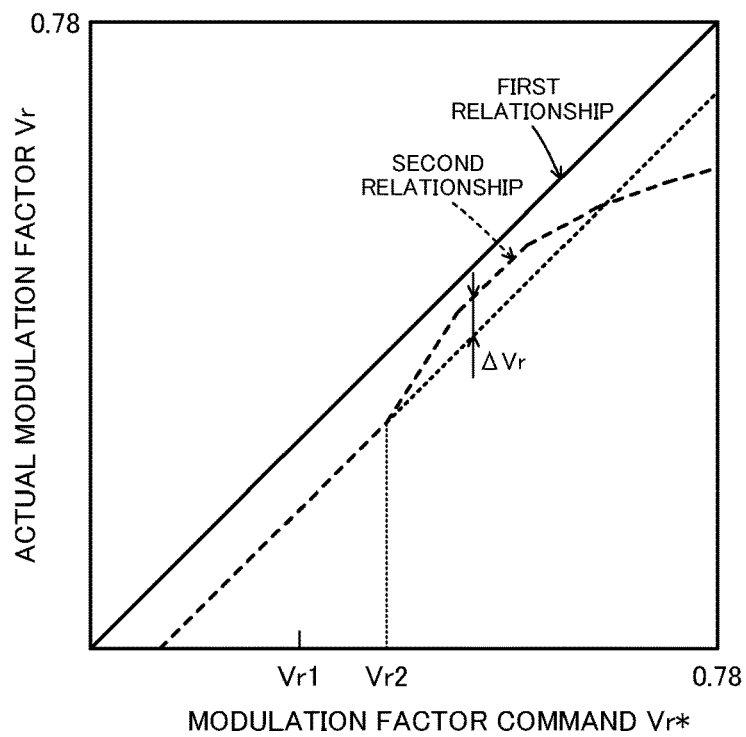
FIG. 11 is a diagram illustrating another example of the relationship between the modulation factor command Vr* and the actual modulation factor Vr.

FIG. 19 and FIG. 11 are diagrams respectively illustrating examples of a relationship between the modulation factor command Vr* and the actual modulation factor Vr. FIG. 10 illustrates the relationship when the modulation mode is the third harmonic wave mode. FIG. 11 illustrates the relationship when the modulation mode is the two-phase modulation mode. In FIGS. 10 and 11, a solid line curve indicates an ideal first relationship between the modulation factor command Vr* and the actual modulation factor Vr (Vr*=Vr). A broken line curve indicates a second relationship that takes into account the effects of voltage differences based on the dead time DT (differences between vectors of the voltage commands Vd* and Vq* and vectors of the actual voltages Vd and Vq in a d-q coordinate system) and the effects of the disappearance of the switching pulses of the transistors T11 to T16. When the modulation mode is the third harmonic wave mode, it is understood from FIG. 10 that the second relationship has linearity in an area where the modulation factor command Vr* is equal to or smaller than a value Vr1 (for example, about 0.60 to 0.66) but does not have linearity in an area where the modulation factor command Vr* is larger than the value Vr1. When the modulation mode is the two-phase modulation mode, on the other hand, it is understood from FIG. 11 that the second relationship has linearity in an area where the modulation factor command Vr* is equal to or smaller than a value Vr2 (for example, about 0.69 to 0.71) that is larger than the value Vr1 but does not have linearity in an area where the modulation factor command Vr* is larger than the value Vr2. The inventors of the present application have confirmed by experiments and analyses that the second relationship does not have the linearity due to an increase in a variation component of a sixth electrical frequency of the motor 32 caused by the disappearance of the switching pulses. The inventors have also confirmed that a current variation amount Ibf of the battery 36 is likely to increase with an increase in a deviation amount ΔVr of the second relationship relative to an auxiliary line having linearity (dotted line curves shown in FIGS. 10 and 11). The switching pulses of the transistors T11 to T16 start disappearing in the area of the lower modulation factor command Vr* when the modulation mode is the third harmonic wave mode, compared with the disappearance of the switching pulses of the transistors T11 to T16 when the modulation mode is the two-phase modulation mode, for the reasons given below.

Figure 12:
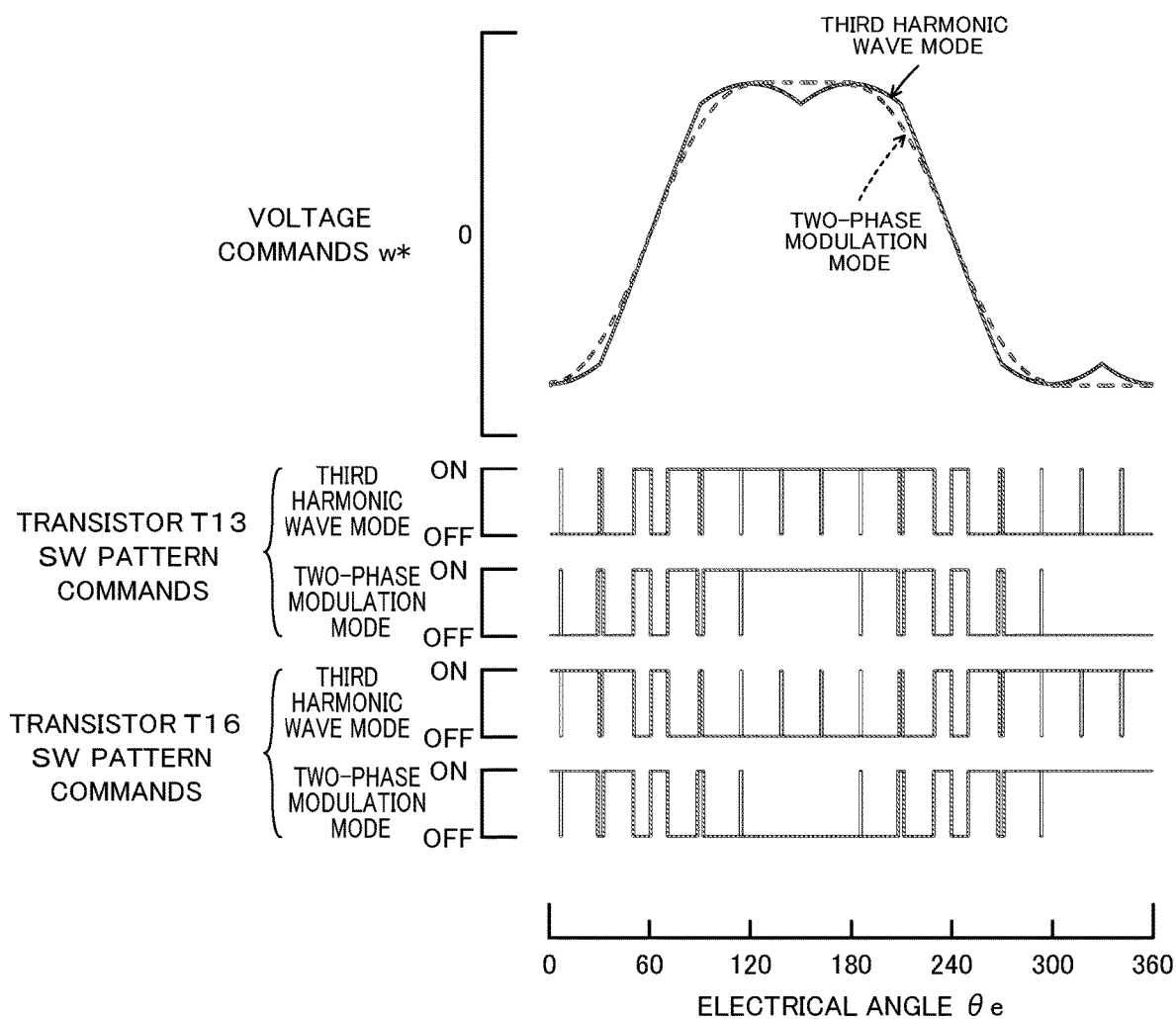
FIG. 12 is a diagram illustrating one example of relationships of an electrical angle θe of a motor to a voltage command Vw* of a W phase and switching pattern commands of transistors T13 and T16.

FIG. 12 is a diagram illustrating one example of relationships of the electrical angle θe of the motor 32 to the voltage command Vw* of the W phase and the switching pattern commands of the transistors T13 and T16. With regard to the voltage command Vw* of the W phase, a solid line curve indicates the relationship when the modulation mode is the third harmonic wave mode, and a broken line curve indicates the relationship when the modulation mode is the two-phase modulation mode. FIG. 12 shows that the voltage command Vw* of the W phase provides the larger absolute values and that the switching pulse of the switching pattern command of the transistor T13 or the transistor T16 provides the smaller widths at the electrical angle θe of the motor 32 of about 30 degrees, about 90 degrees, about 210 degrees and about 270 degrees when the modulation mode is the third harmonic wave mode, compared with the absolute values and the widths when the modulation mode is the two-phase modulation mode. As described above with reference to FIG. 9, when the switching pulse of the switching pattern command of the transistor T13 or the transistor T16 has the smaller width, the dead time DT is more likely to cause, the disappearance of the switching pulse of the actual switching pattern of the transistor T13 or the transistor T16. The voltage command Vw* of the W phase provides the larger absolute values at the electrical angle θe of the motor 32 of about 120 degrees to 180 degrees and about 300 degrees to 360 degrees when the modulation mode is the two-phase modulation mode, compared with the absolute values when the modulation mode is the third harmonic wave mode. The switching pattern command of the transistor T13 or the transistor T16 is, however, kept ON or kept OFF in these ranges of the electrical angle θe. Accordingly, the dead time DT does not cause the disappearance of the switching pulse of the actual switching pattern of the transistor T13 or the transistor T16.

By taking into account the foregoing, according to the embodiment, the reference value Vrref2 may be set to, for example, the value Vr1 described above or a slightly smaller value than the value Vr1, as the modulation factor expected to give the current variation amount Ibf of the battery 36 that is equal to or smaller than an allowable current variation amount Ibflim when the control mode of the inverter 34 is the current feedback control mode and the modulation mode is the third harmonic wave mode. The reference value Vrref1 may be, on the other hand, set to, for example, the value Vr2 described above or a slightly smaller value than the value Vr2, as the modulation factor expected to give the current variation amount Ibf of the battery 36 that is equal to or smaller than the allowable current variation amount Ibflim when the control mode of the inverter 34 is the current feedback control mode and the modulation mode is the two-phase modulation mode. The allowable current variation amount Ibflim of the battery 36 denotes an allowable value of the current variation amount Ibf of the battery 36. The allowable current variation amount Ibflim is determined, based on the specification of the driving system and may be set to, for example, about 100 A to 200 A when the rated current of the battery 36 is about 500 A.

The following describes the command value setting process of FIG. 4. In this command value setting process, the electronic control unit 50 first checks the control mode of the inverter 34 (step S400). When the control mode of the inverter 34 is the current feedback control mode, the electronic control unit 50 calculates voltage commands Vd* and Vq* of the d axis and the q axis according to Equation (17) and Equation (18) given below by using the electric currents Id and Iq and the current commands Id* and Iq* of the d axis and the q axis (step S410). Equation (17) and Equation (18) are relational expressions of current feedback control to cancel out differences between the electric currents Id and Iq and the current commands Id* and Iq* of the d axis and the q axis. In Equation (17) and Equation (18), "kp1" and "kp2" denote gains of proportional, and "ki1" and "ki2" denote gains of integral term.

$$Vd^* = kp1 \cdot (Id^* - Id) + ki1 \cdot \int (Id^* - Id)dt \quad (17)$$

$$Vq^* = kp1 \cdot (Iq^* - Iq) + ki2 \cdot \int (Iq^* - Iq)dt \quad (18)$$

The electronic control unit 50 subsequently calculates a voltage phase command φvd* according to Equation (19) given below by using the voltage commands Vd* and Vq* of the d axis and the q axis (step S420), calculates a modulation factor command Vr* according to Equation (20) given below by using the voltage commands Vd* and Vq* of the d axis and the q axis (step S430) and then terminates the command value setting process of FIG. 4. After setting the modulation factor command Vr* and the voltage phase command φvd*, the electronic control unit 50 performs the switching pattern command setting process of FIG. 5 to set the switching pattern commands of the transistors T11 to T16, to add the dead time DT to the set switching pattern commands of the transistors T11 to T16 and to perform switching control of the transistors T11 to T16 as described above.

Math. 3

$$\phi vd* = \tan^{-1}\frac{Vq*}{Vd*} \quad (19)$$

$$Vr* = \frac{\sqrt{Vd*^2 + Vq*^2}}{Vc} \quad (20)$$

When the control mode of the inverter 34 is the torque feedback control mode at step S400, on the other hand, the electronic control unit 50 derives an estimated torque Tmes that denotes a torque expected to be output from the motor 32, based on the electric currents Id and Iq of the d axis and the q axis (step S440). According to the embodiment, a procedure of deriving the estimated torque Tmes specifies and stores in advance a relationship between the electric currents Id and Iq of the d axis and the q axis and the estimated torque Tmes of the motor 32 in the form of a map in the ROM 52 and reads a value of the estimated torque Tmes of the motor 32 corresponding to given values of the electric currents Id and Iq of the d axis and the q axis from the map. Another procedure may directly derive the estimated torque Tmes of the motor 32 from the electric currents Iu, Iv and Iw of the respective phases.

The electronic control unit 50 subsequently calculates the voltage phase command φvd* according to Equation (21) given below by using the estimated torque Tmes and the torque command Tm* of the motor 32 (step S450). Equation (21) is a relational expression of torque feedback control to cancel out a difference between the estimated torque Tmes and the torque command Tm* of the motor 32. In Equation (21), "kp3" denotes a gain of proportional, and "ki3" denotes a gain of integral term.

$$\phi vd* = kp3\cdot(Tm*-Tmes) + ki3\cdot\int(Tm*-Tmes)dt \quad (21)$$

The electronic control unit 50 subsequently calculates a sixth electrical frequency fm6 [Hz] of the motor 32 according to Equation (22) given below by using a number of pole pairs Polo and the rotation speed Nm [rpm] of the motor 32 (step S460) and then derives a resonance gain Grs of a DC part that is on the battery 36-side of the inverter 34, based on the calculated sixth electrical frequency fm6 of the motor 32 (step S470).

$$fm6=1/(60/\text{Pole})\cdot Nm\cdot 6 \quad (22)$$

Figure 13:
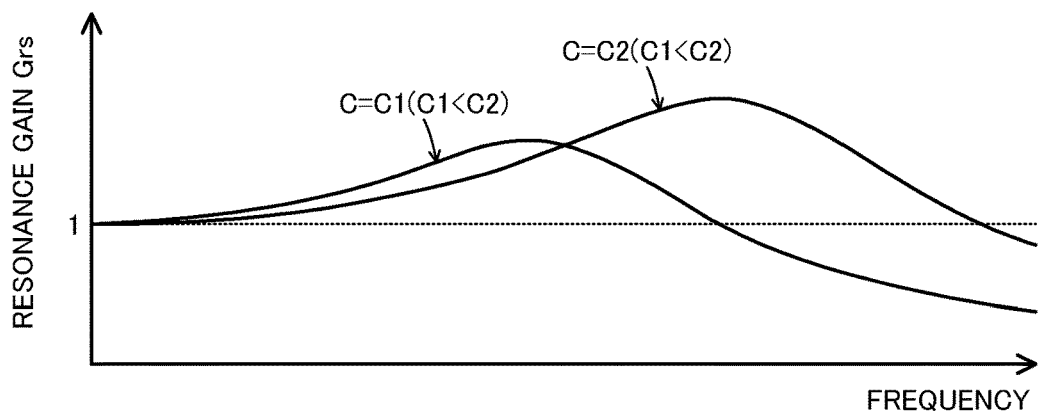
FIG. 13 is a diagram illustrating one example of a Bode diagram of a transfer function Ib/Iinv.

The following describes a procedure of deriving the resonance gain Grs of the DC part. A transfer function Ib/Iinv of the electric current Ib of the battery 36 and the electric current Iinv of the inverter 34 with regard to the DC part can be expressed by Equation (23) given below by using an inductance value L, a capacitance value C and a resistance value R of the DC part. In Equation (23), "s" denotes a Laplacian operator. The inductance value L of the DC part is determined, based on, for example, an inductance value of the power lines 38. The capacitance value C of the DC part is determined, based on, for example, an electrostatic capacitance of the capacitor 39. The resistance value R of the DC part is determined, based on, for example, an internal resistance value of the battery 36 and a resistance value of the power lines 38. FIG. 13 is a Bode diagram of this transfer function Ib/Iinv. The Bode diagram of FIG. 13 illustrates examples when the capacitance value C of the DC part is equal to a value C1 and is equal to a value C2 that is larger than the value C1. According to the embodiment, the procedure applies the sixth electrical frequency fm6 of the motor 32 to this Bode diagram to derive the resonance gain Grs of the DC part.

Math. 4

$$\frac{Ib}{Iinv} = \frac{\frac{1}{LC}s^2}{s^2 + \frac{R}{L}s + \frac{1}{LC}} \quad (23)$$

The electronic control unit 50 subsequently calculates an output power Pb of the battery 36 as the product of the voltage Vb and the electric current Ib of the battery 36 (step S480), and calculates an allowable sixth electrical power Pm6lim of the motor 32 according to Equation (24) given below by using the calculated output power Pb of the battery 36, the derived resonance gain Grs of the DC part, and the allowable current variation amount Ibflim of the battery 36 described above (step S490). The allowable sixth electrical power Pm6lim denotes an allowable amount of the sixth electrical power Pm6 of the motor 32.

$$Pm6\text{lim}=Ib\text{flim}/(Pb\cdot Grs) \quad (24)$$

Figure 14:
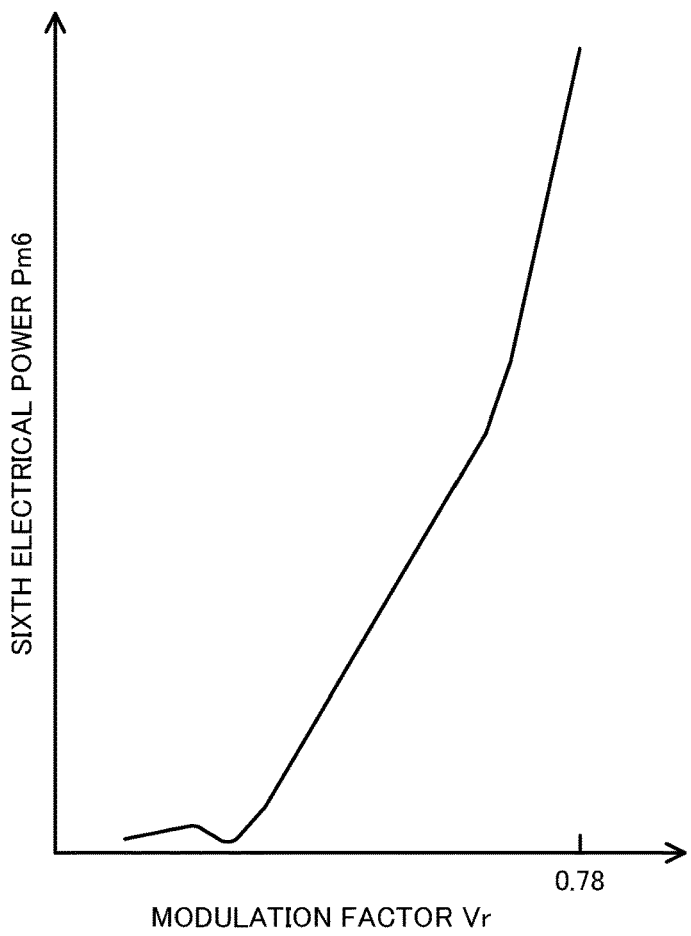
FIG. 14 is a diagram illustrating one example of a relationship between the modulation factor Vr and a sixth electrical power Pm6 of the motor.

After calculating the allowable sixth electrical power Pm6lim, the electronic control unit 50 sets an allowable modulation factor Vrchk, based on the calculated allowable sixth electrical power Pm6lim (step S500). According to the embodiment, a procedure of setting the allowable modulation factor Vrchk specifies and stores in advance a relationship between the modulation factor Vr and the sixth electrical power Pm6 of the motor 32 in the form of a map in the ROM 52. When a value of the allowable sixth electrical power Pm6lim is given, the procedure applies the given value of the allowable sixth electrical power Pm6lim to the map and sets a value of the modulation factor Vr corresponding to the given value of the allowable sixth electrical power Pm6lim, as the allowable modulation factor Vrchk. FIG. 14 is a diagram illustrating one example of the relationship between the modulation factor Vr and the sixth electrical power Pm6 of the motor 32. This relationship is determined, based on the specification of the driving system. The two-phase modulation mode is employed as the modulation mode, when the control mode of the inverter 34 is the torque feedback control mode as described above. Accordingly, the relationship between the modulation factor Vr and the sixth electrical power Pm6 of the motor 32 is determined as the relationship when the modulation mode is the two-phase modulation mode.

After setting the allowable modulation factor Vrchk as described above, the electronic control unit 50 sets the set allowable modulation factor Vrchk to a modulation factor command Vr* (step S510) and then terminates the command value setting process of FIG. 4. After setting the modulation factor command Vr* and the voltage phase command φvd*, the electronic control unit 50 performs the switching pattern command setting process of FIG. 5 to set the switching pattern commands of the transistors T11 to T16, to add the dead time DT to the set switching pattern commands of the transistors T11 to T16 and to perform switching control of the transistors T11 to T16 as described above.

As described above, the configuration of the embodiment sets the allowable sixth electrical power Pm6lim of the motor 32, based on the allowable current variation amount Ibflim of the battery 36, subsequently sets the allowable modulation factor Vrchk, based on the set allowable sixth electrical power Pm6lim of the motor 32, and then controls the inverter 34, based on this set allowable modulation factor Vrchk. This configuration suppresses the current variation amount Ibf of the battery 36 from increasing to be larger than the allowable current variation amount Ibflim.

As described above, when the control mode of the inverter 34 is the torque feedback control mode, the driving system mounted on the electric vehicle 20 according to the embodiment sets the allowable modulation factor Vrchk, based on the allowable current variation amount Ibflim of the battery 36 (such that the current variation amount Ibf of the battery 36 becomes equal to the allowable current variation amount Ibflim), and controls the inverter 34, based on this set allowable modulation factor Vrchk. This configuration suppresses the current variation amount Ibf of the battery 36 from increasing to be larger than the allowable current variation amount Ibflim.

The driving system mounted on the electric vehicle 20 according to the embodiment sets the allowable modulation factor Vrchk, such that the current variation amount Ibf of the battery 36 becomes equal to the allowable current variation amount Ibflim, when the control mode of the inverter 34 is the torque feedback control mode. A modification may set the allowable modulation factor Vrchk, such that the current variation amount Ibf of the battery 36 becomes equal to or smaller than the allowable current variation amount Ibflim.

The driving system mounted on the electric vehicle 20 according to the embodiment employs the third harmonic wave mode and the two-phase modulation mode as the modulation mode. A modification may employ only the third harmonic wave mode as the modulation mode. This modification may perform a mode setting process of FIG. 15, in place of the mode setting process of FIG. 3, may use a different map at step S500 in the command value setting process of FIG. 4 and may omit the processing of step S630 and the processing of steps S650 to S670 in the switching pattern command setting process of FIG. 5.

Figure 15:
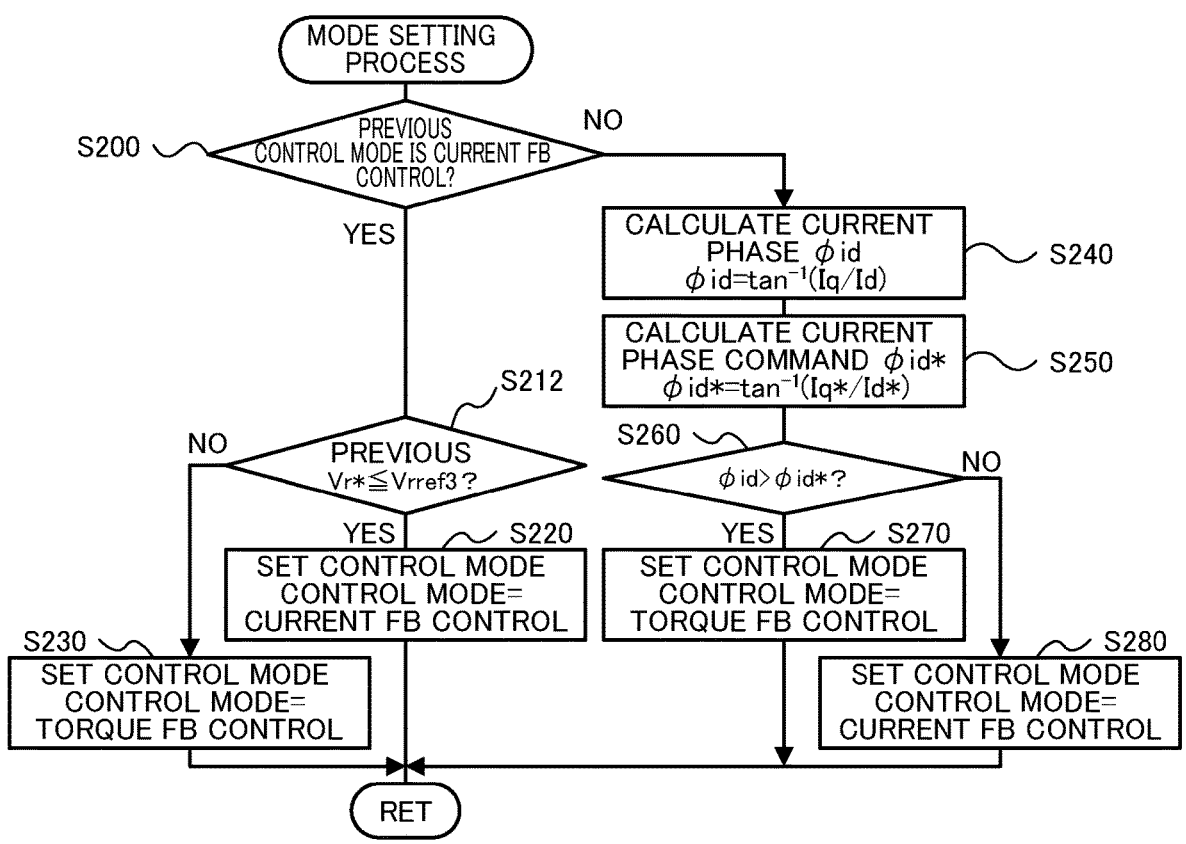
FIG. 15 is a flowchart showing one example of a mode setting process according to a modification.

The mode setting process of FIG. 15 is similar to the mode setting process of FIG. 3, except that the processing of step S212 is performed in place of the processing of step S210 and that the processing of steps S290 to S310 is omitted. The like processing steps are expressed by the like step numbers, and their detailed description is omitted.

In the mode setting process of FIG. 15, when the previous control mode of the inverter 34 is the current feedback control mode at step S200, the electronic control unit 50 compares the previous modulation factor command (previous Vr*) with a reference value Vref 3 (step S212). When the previous modulation factor command (previous Vr*) is equal to or smaller than the reference value Vrref3, the electronic control unit 50 sets the current feedback control mode as the control mode of the inverter 34 (step S220) and then terminates the mode setting process of FIG. 15. When the previous modulation factor command (previous Vr*) is larger than the reference value Vrref3, on the other hand, the electronic control unit 50 sets the torque feedback control mode as the control mode of the inverter 34 (step S230) and then terminates the mode setting process of FIG. 15. The reference value Vrref3 is preferably equal to the reference value Vrref1 or a value around the reference value Vrref1 by taking into account the contents of FIGS. 8 to 10.

Figure 16:
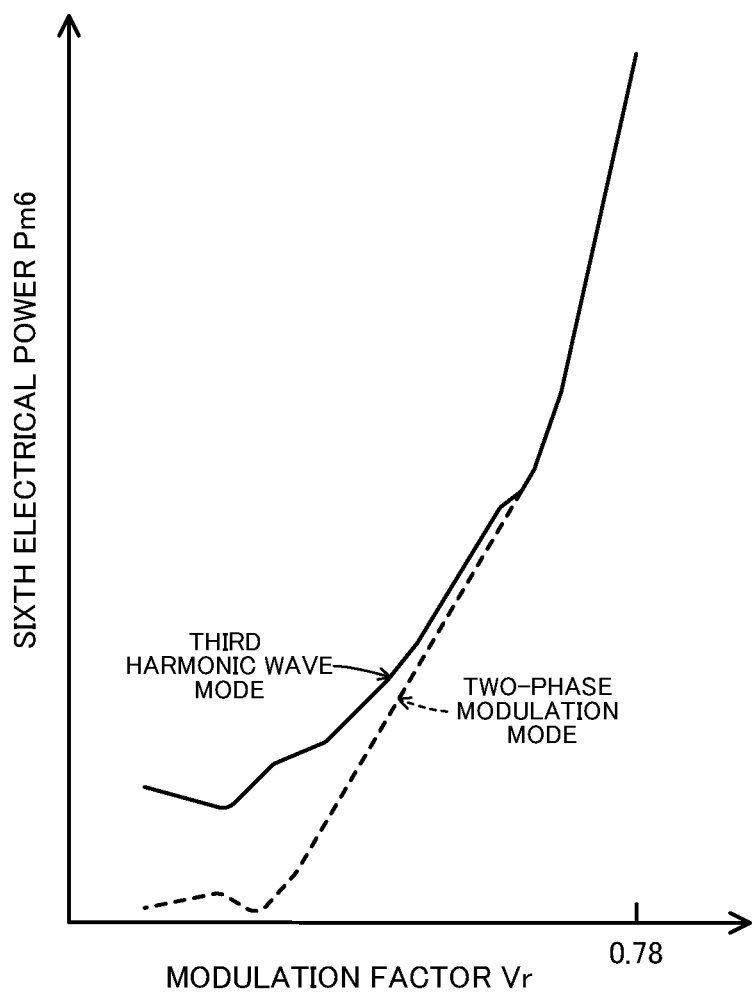
FIG. 16 is a diagram illustrating one example of a relationship between the modulation factor Vr and the sixth electrical power Pm6 of the motor according to the modification.

FIG. 16 is a diagram illustrating one example of the map (the relationship between the modulation factor Vr and the sixth electrical power Pm6 of the motor 32) used at the processing of step S500 in the command value setting process of FIG. 4 according to this modification. According to this modification, when the control mode of the inverter 34 is the torque feedback control mode, the third harmonic wave mode is employed as the modulation mode. Accordingly, the relationship between the modulation factor Vr and the sixth electrical power Pm6 of the motor 32 is determined as the relationship when the modulation mode is the third harmonic wave mode. For reference, the map that is to be employed when the modulation mode is the two-phase modulation mode (as shown in FIG. 14) is shown as a broken line curve. The maps of FIG. 16 indicate that the third harmonic wave mode employed as the modulation mode provides the smaller modulation factor Vr corresponding to an identical value of the sixth electrical power Pm6 of the motor 32, compared with the two-phase modulation mode. In other words, the third harmonic wave mode provides the smaller allowable modulation factor Vrchk corresponding to an identical value of the allowable sixth electrical power Pm6lim of the motor 32, compared with the two-phase modulation mode. This is because the third harmonic wave mode employed as the modulation mode is likely to cause the disappearance of the switching pulses of the transistors T11 to T16 in the lower range of the modulation factor command Vr* and is likely to provide the larger current variation amount Ibf of the battery 36 and the larger sixth electrical power Pm6 of the motor 32, compared with the two-phase modulation mode, as described above.

The configuration of this modification suppresses the current variation amount Ibf of the battery 36 from increasing to be larger than the allowable current variation amount Ibflim, like the configuration of the embodiment described above.

The driving system mounted on the electric vehicle 20 of the embodiment sets the allowable sixth electrical power Pm6lim of the motor 32, based on the allowable current variation amount Ibflim and the output power Pb of the battery 36 and sets the allowable modulation factor Vrchk, based on the set allowable sixth electrical power Pm6lim of the motor 32. A modification may derive an estimated current variation amount Ibfes of the battery 36 and may set the allowable modulation factor Vrchk such that the derived estimated current variation amount Ibfes becomes equal to or smaller than the allowable current variation amount Ibflim. Another modification may apply the previous modulation factor command (previous Vr*) to the map of FIG. 14 to derive an estimated sixth electrical power Pm6es of the motor 32, may calculate an estimated current variation amount Ibfes of the battery 36 as the product of the derived estimated sixth electrical power Pm6es of the motor 32, the output power Pb of the battery 36 and the resonance gain Grs or the DC part according to Equation (25) given below, and may set the allowable modulation factor Vrchk such that the estimated current variation amount Ibfes of the battery 36 becomes equal to or smaller than the allowable current variation amount Ibflim.

$$Ibfes = Pm6es \cdot Pb \cdot Grs \quad (25)$$

The driving system mounted on the electric vehicle 20 according to the embodiment uses the battery 36 as the power storage device. A modification may use a capacitor as the power storage device.

In the driving system of the above aspect, the control device may estimate a resonance gain of the DC part, based on the circuit characteristic of the DC part and a sixth electrical frequency of the motor; may estimate an allowable sixth electrical power of the motor, based on an output power of the power storage device, the resonance gain and the allowable current variation amount; and may set the allowable modulation factor such that a sixth electrical power of the motor becomes equal to or smaller than the allowable sixth electrical power. This configuration enables the allowable modulation factor to be set more appropriately by taking into account the resonance gain of the DC part and the output power of the power storage device.

In the driving system of the above aspect, the control device may set a modulation factor command and a voltage phase command by current feedback control when a modulation factor is equal to or smaller than a predetermined modulation factor; may set the voltage phase command by torque feedback control, while setting the allowable modulation factor to the modulation factor command when the modulation factor is larger than the predetermined modulation factor; and may set the switching pattern commands of the plurality of switching elements, based on the modulation factor command and the voltage phase command. This configuration enables the control to be changed over between the current feedback control and the torque feedback control based on the modulation factor and suppresses an increase in the current variation amount of the power storage device in the torque feedback control.

In this case, in the driving system of the above aspect, the control device may set tentative voltage commands of respective phases, based on the modulation factor command and the voltage phase command; may set voltage commands of the respective phases by adding a correction value of third harmonic wave to the set tentative voltage commands of the respective phases when the modulation factor is equal to or smaller than a second predetermined modulation factor that is smaller than the predetermined modulation factor, while setting the voltage commands of the respective phases by adding a correction value of two-phase modulation to the set tentative voltage commands of the respective phases when the modulation factor is larger than the second predetermined modulation factor; and may set the switching pattern commands of the plurality of switching elements, based on the voltage commands of the respective phases.

In this case, in the driving system of the above aspect, the control device may set tentative voltage commands of respective phases, based on the modulation factor command and the voltage phase command; may set voltage commands of the respective phases by adding a correction value of third harmonic wave to the set tentative voltage commands of the respective phases; and may set the switching pattern commands of the plurality of switching elements, based on the voltage commands of the respective phases.

Furthermore, in this case of the driving system of the above aspect, the control device may shift control to the torque feedback control when the modulation factor becomes larger than the predetermined modulation factor during the current feedback control; and may shift the control to the current feedback control when a current phase based on electric currents of a d axis and a q axis becomes equal to or smaller than a current command phase based on current commands of the d axis and the q axis during the torque feedback control.

The above embodiment describes the driving system mounted on the electric vehicle 20 that is equipped with the motor 32 and the inverter 34. The present, disclosure may also be implemented by a driving system mounted on a hybrid vehicle that is equipped with an engine in addition to the motor 32 and the inverter 34, a driving system mounted on a moving body, for example, any of ships and boats, aircraft, and various vehicles other than motor vehicles, or a driving system placed in any of stationary equipment including construction equipment.

The following describes the correspondence relationship between the primary elements of the above embodiment and the primary elements of the disclosure described in Summary. The motor 32 of the embodiment corresponds to the "motor", the inverter 34 corresponds to the "inverter", the battery 36 corresponds to the "power storage device", the capacitor 39 corresponds to the "capacitor", and the electronic control unit 50 corresponds to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present, disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present, disclosure.

INDUSTRIAL APPLICABILITY

The disclosure is applicable to, for example, the manufacturing industries of driving systems.

What is claimed is:

1. A driving system, comprising:
a motor;
an inverter configured to drive the motor by switching of a plurality of switching elements;
a power storage device connected with the inverter via a power line;
a capacitor mounted to the power line; and
a control device configured to add a dead time to switching pattern commands of the plurality of switching elements and perform switching control of the plurality of switching elements, wherein
the control device sets an allowable modulation factor, based on a circuit characteristic of a DC part that is on a power storage device side of the inverter, such that a current variation amount of the power storage device becomes equal to or smaller than an allowable current variation amount, and sets the switching pattern commands of the plurality of switching elements, based on the set allowable modulation factor.

2. The driving system according to claim 1,
wherein the control device estimates a resonance gain of the DC part, based on the circuit characteristic of the DC part and a sixth electrical frequency of the motor; estimates an allowable sixth electrical power of the motor, based on an output power of the power storage device, the resonance gain and the allowable current variation amount; and sets the allowable modulation factor such that a sixth electrical power of the motor becomes equal to or smaller than the allowable sixth electrical power.

3. The driving system according to claim 1,
wherein the control device sets a modulation factor command and a voltage phase command by current feedback control when a modulation factor is equal to or smaller than a predetermined modulation factor; sets the voltage phase command by torque feedback control, while setting the allowable modulation factor to the modulation factor command when the modulation factor is larger than the predetermined modulation factor; and sets the switching pattern commands of the plurality of switching elements, based on the modulation factor command and the voltage phase command.

4. The driving system according to claim 3,
wherein the control device sets tentative voltage commands of respective phases, based on the modulation factor command and the voltage phase command; sets voltage commands of the respective phases by adding a correction value of third harmonic wave to the set tentative voltage commands of the respective phases when the modulation factor is equal to or smaller than a second predetermined modulation factor that is smaller than the predetermined modulation factor, while setting the voltage commands of the respective phases by adding a correction value of two-phase modulation to the set tentative voltage commands of the respective phases when the modulation factor is larger than the second predetermined modulation factor; and sets the switching pattern commands of the plurality of switching elements, based on the voltage commands of the respective phases.

5. The driving system according to claim 3,
wherein the control device sets tentative voltage commands of respective phases, based on the modulation factor command and the voltage phase command; sets voltage commands of the respective phases by adding a correction value of third harmonic wave to the set tentative voltage commands of the respective phases; and sets the switching pattern commands of the plurality of switching elements, based on the voltage commands of the respective phases.

6. The driving system according to claim 3,
wherein the control device shifts control to the torque feedback control when the modulation factor becomes larger than the predetermined modulation factor during the current feedback control; and shifts the control to the current feedback control when a current phase based on electric currents of a d axis and a q axis becomes equal to or smaller than a current command phase based on current commands of the d axis and the q axis during the torque feedback control.

* * * * *